(12) United States Patent
Supina et al.

(10) Patent No.: US 7,694,762 B2
(45) Date of Patent: Apr. 13, 2010

(54) HYBRID VEHICLE POWERTRAIN WITH IMPROVED REVERSE DRIVE PERFORMANCE

(75) Inventors: Joseph G. Supina, Belleville, MI (US); Stefan P. Pototschnik, Dearborn, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 1280 days.

(21) Appl. No.: 10/605,315

(22) Filed: Sep. 22, 2003

(65) Prior Publication Data

US 2009/0205886 A1 Aug. 20, 2009

(51) Int. Cl.
*B60K 6/04* (2006.01)

(52) U.S. Cl. .................... 180/65.25; 180/65.6

(58) Field of Classification Search .............. 180/65.1, 180/65.2, 65.3, 65.6
See application file for complete search history.

(56) References Cited

U.S. PATENT DOCUMENTS

| | | | |
|---|---|---|---|
| 5,730,676 A | | 3/1998 | Schmidt |
| 5,775,449 A | | 7/1998 | Moroto et al. |
| 5,788,006 A | | 8/1998 | Yamaguchi |
| 5,839,533 A | * | 11/1998 | Mikami et al. .............. 180/165 |
| 5,846,155 A | * | 12/1998 | Taniguchi et al. .............. 477/2 |
| 5,887,670 A | * | 3/1999 | Tabata et al. ............... 180/65.2 |
| 5,899,286 A | | 5/1999 | Yamaguchi |
| 5,934,396 A | * | 8/1999 | Kurita ....................... 180/65.2 |
| 5,935,035 A | | 8/1999 | Schmidt |
| 5,935,040 A | * | 8/1999 | Tabata et al. .................... 477/3 |
| 5,951,614 A | * | 9/1999 | Tabata et al. .................. 701/54 |
| 6,081,042 A | * | 6/2000 | Tabata et al. .................. 290/45 |
| 6,302,227 B1 | | 10/2001 | Takemura et al. |
| 6,317,665 B1 | * | 11/2001 | Tabata et al. .................. 701/22 |
| 6,387,007 B1 | | 5/2002 | Fini, Jr. |
| RE37,743 E | * | 6/2002 | Yang .............................. 477/3 |
| 6,407,521 B1 | | 6/2002 | Raftari et al. |
| 6,427,794 B1 | | 8/2002 | Raftari et al. |
| 6,478,705 B1 | | 11/2002 | Holmes et al. |
| 6,603,215 B2 | | 8/2003 | Kuang et al. |
| 2002/0023790 A1 | | 2/2002 | Hata et al. |
| 2002/0065162 A1 | | 5/2002 | Kaneko et al. |

FOREIGN PATENT DOCUMENTS

| | | |
|---|---|---|
| BE | 1011629 A7 | 9/1999 |
| EP | 1 260 397 A2 | 11/2002 |
| EP | 1 279 544 A2 | 1/2003 |
| JP | 2000-045813 | 2/2000 |
| JP | 2004-056922 | 2/2004 |
| WO | WO 03/035421 A1 | 5/2003 |

* cited by examiner

*Primary Examiner*—Christopher P Ellis
*Assistant Examiner*—Bridget Avery
(74) *Attorney, Agent, or Firm*—David B. Kelley; Brooks Kushman P.C.

(57) ABSTRACT

A hybrid-electric powertrain for a wheeled vehicle having an internal combustion engine, an electric generator, an electric motor and a battery. Transmission gearing establishes multiple torque flow paths including a forward drive torque flow path and a reverse drive torque flow path, the motor being isolated from forward drive gearing elements as it acts as a sole reverse drive power source.

11 Claims, 3 Drawing Sheets

US 7,694,762 B2

HYBRID VEHICLE POWERTRAIN WITH IMPROVED REVERSE DRIVE PERFORMANCE

CROSS REFERENCE TO RELATED APPLICATIONS

This application is related to U.S. application Ser. No. 10/605,313 filed Sep. 22, 2003, by Ming Kuang et al. entitled "A Controller And Control Method For A Hybrid Electric Vehicle Powertrain" and U.S. application Ser. No. 10/605,309, filed Sep. 22, 2003, by Ming Kuang et al. entitled "Control System for a Hybrid Electric Vehicle Powertrain". Those applications and the present application have a common Assignee.

BACKGROUND OF INVENTION

1. Field of the Invention

The invention relates to a hybrid electric vehicle powertrain having an internal combustion engine and an electric motor/generator and battery sub-system, which are independent power sources for powering vehicle traction wheels. At least one power flow path is established between each power source and the traction wheels through transmission gearing.

2. Background Art and Discussion of a Known Hybrid Powertrain

U.S. Pat. Nos. 6,407,521 and 6,427,794 disclose hybrid vehicle powertrains having a motor/generator and an internal combustion engine, which function in cooperation with a planetary gear unit to define multiple power flow paths. The engine and the motor/generator provide parallel power delivery through the gear unit during one operating mode. The motor/generator can be used to establish a power flow path independently of the engine.

U.S. Pat. No. 6,176,808 discloses a hybrid powertrain wherein an engine and an induction motor act in parallel power flow paths. The induction motor provides torque to complement engine torque during vehicle acceleration. It also can be clutched to the engine crankshaft to permit engine starting.

In the copending patent application identified above, the disclosure of which is incorporated herein by reference, the planetary gear unit provides a mechanical power flow path between a generator and an engine. A separate motor acts as a secondary power source. The motor may act as a series power source or it may function in cooperation with the engine to establish split power delivery paths through the planetary gear unit. Further, the generator may function as a motor in a torque flow path through the planetary gear unit.

In the case of the hybrid transmission of the copending patent application, the planetary ring gear is connected directly to the output torque delivery shaft through a set of fixed ratio gears. This makes it possible for torque to be distributed from the planetary gear set to the vehicle traction wheels during forward drive. To establish reverse drive, it is necessary to use the electric motor as a torque source since the engine is effective to deliver driving torque through the planetary gearing only in the forward drive mode.

If the state-of-charge of the battery during reverse drive is below a desired level, operation in reverse drive must be severely restricted in order to protect the battery. If an attempt is made to charge the battery by operating the engine to create generator power for charging the battery, the reaction element of the planetary gear unit (which in this instance is the ring gear) would be subjected to reaction torque that must be overcome by the electric motor in order to achieve reverse drive. This limits reverse drive performance for the hybrid electric vehicle.

SUMMARY OF INVENTION

The hybrid electric vehicle powertrain of the present invention includes an internal combustion engine and an electric motor, together with an electric generator and a storage battery, wherein a power delivery path is established as the engine drives the generator. The generator, in turn, charges the battery as the motor is supplied with power from the battery during reverse drive.

A geared transmission establishes plural power delivery paths between the engine, the motor, and the vehicle traction wheels. The transmission includes a clutch, which can isolate the gearing from the power output portion of the powertrain so that the engine can drive the generator.

The transmission is capable of functioning as an engine starter-torque flow path for cranking the engine without the need for the motor to supply reaction torque to the generator during engine starting as the generator acts as a motor.

In carrying out the foregoing functions, the transmission gearing includes a first element connected drivably to the engine and a second element drivably connected through a clutch to the motor. The generator is connected to a third element of the gearing, and a reaction brake anchors a reaction element of the gearing as the engine drives the electric generator in a forward power delivery mode and the motor drives the vehicle wheels through the gearing. When the powertrain acts in this power delivery mode during forward drive, electric motor power and engine power are in series.

During reverse drive a clutch, located between the electric motor and gear elements of the geared transmission, is released to condition the powertrain for reverse drive operation. The engine then drives the generator to charge the battery through a power flow path that is isolated by the clutch from the reverse drive reaction torque. The direction of rotation of the motor armature is reversed at that time. In another embodiment, a clutch is used to establish a direct drive between the engine and the generator to isolate the power flow path from the reverse reaction torque.

The hybrid electric vehicle powertrain of the present invention makes it possible to eliminate the effect of the ring gear reaction torque of the design of the copending patent application during reverse drive by interrupting a mechanical connection between the ring gear and the torque output portions of the powertrain.

PARTICULAR DESCRIPTION OF THE INVENTION

Figure 1:
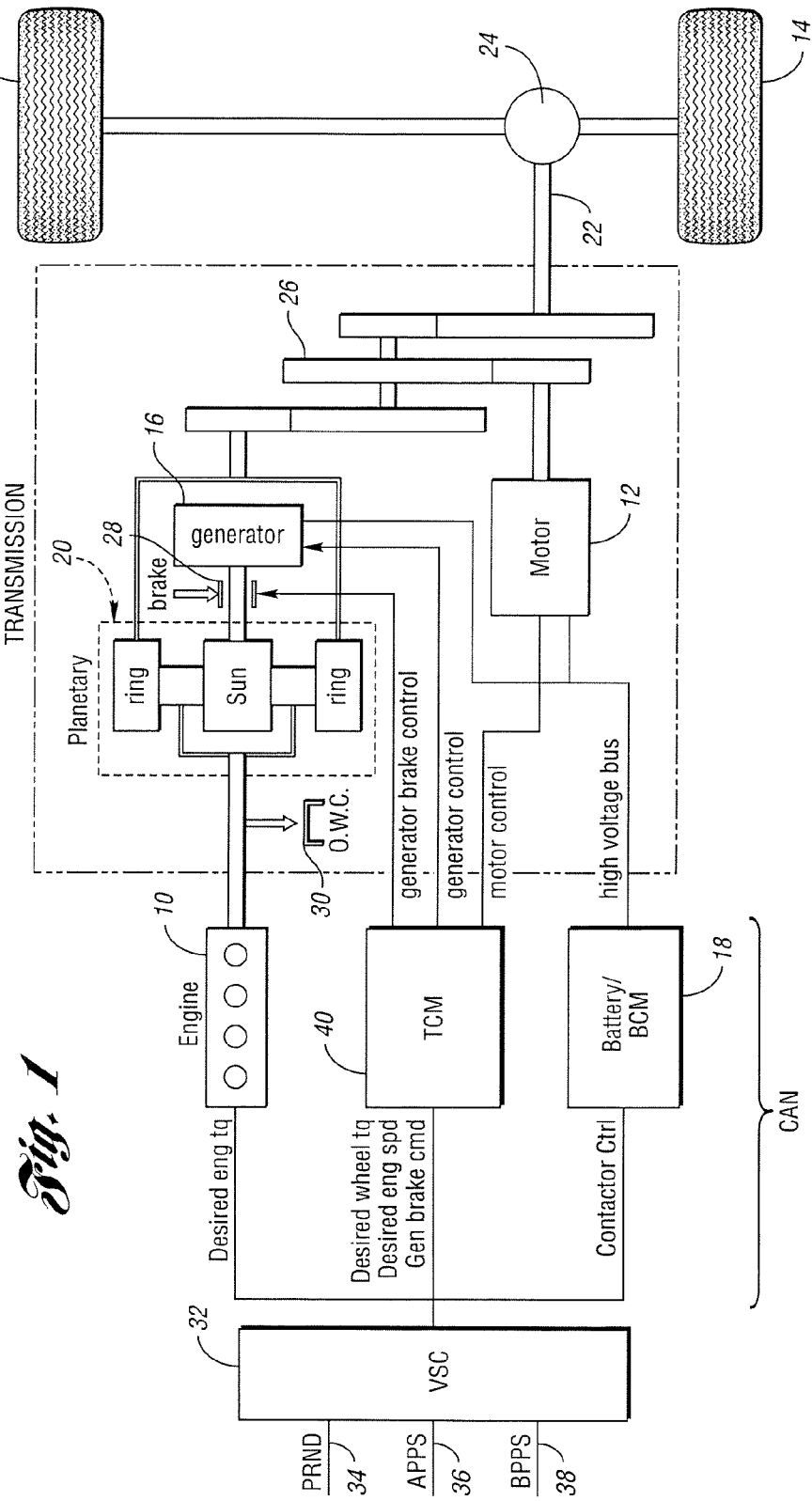
FIG. 1 is a schematic representation of a hybrid electric vehicle powertrain of the kind disclosed in the previously identified copending patent application.

The powertrain illustrated in FIG. 1 is a power-split hybrid electric vehicle powertrain, which includes a transmission, an internal combustion engine 10 and an electric motor 12, typically a high voltage induction motor. These elements establish parallel power flow paths to the vehicle traction wheels, shown at 14. A first power flow path comprises a combination of the engine and a motor/generator sub-system, including electric generator 16 and motor 12 together with battery 18, the latter functioning as an electric energy storing device. The engine and the motor/generator sub-system function with a planetary gear unit 20 to distribute torque through separate power flow paths. A second power flow path comprises the motor 12, the generator 16 and the battery 18.

The generator in a power-split hybrid powertrain of the kind shown in FIG. 1 is driven by the engine through planetary gear unit 20. A mechanical power flow path is established between the engine 10 and the transmission torque output shaft 22, which delivers torque to an axle-and-differential assembly 24 for the traction wheels. The other power flow path is an electrical power flow path, which distributes power from the engine to the generator, the latter driving the torque output shaft through the transmission gearing. The transmission gearing, in addition to the planetary gearing 20, includes countershaft gearing 26.

When the powertrain is operated using the first power flow path, engine power is divided between two power flow paths by controlling generator speed. This implies that the engine speed can be decoupled from the vehicle speed. This results in a mode of operation that is similar to a continuously variable transmission operating mode where vehicle speed changes do not depend upon engine speed changes. This operating mode can be referred to as a positive power split.

The powertrain also can operate in a mode of operation that may be referred to as a negative power split. In this instance, the planetary gearing is driven by the generator. The generator, the motor and the planetary gearing thus function as an electro-mechanical, continuously-variable transmission. A generator brake 28 can be applied to establish an operating mode in which engine power is transmitted with a fixed gear ratio solely through a mechanical torque flow path.

When the first power flow path is active, it can provide only forward drive propulsion since there is no reverse gear. The engine requires either a generator speed control or a generator brake to transmit output power through the drivetrain for forward motion.

When the second power flow path is active, the electric motor draws power from the battery and provides propulsion independently of the engine for driving the vehicle in both forward and reverse. The generator can draw power from the battery and drive against overrunning coupling or brake 30 on the engine output shaft to propel the vehicle forward. This mode of operation is referred to as generator drive.

The powertrain shown in FIG. 1 includes a vehicle system controller 32, which responds to driver inputs 34, 36 and 38. These, respectively, are the transmission range selection, accelerator pedal position and brake pedal position. The desired wheel torque, the desired engine speed and the generator brake command are distributed to a transmission control module 40.

The vehicle system controller will act on the engine and the motor/generator sub-system so that they function together seamlessly as they deliver torque through the gearing to the vehicle traction wheels. This ensures that performance limits on the battery sub-system are not exceeded. When the powertrain is operating under normal conditions, the vehicle controller 32 will respond to the driver's input commands and determine when and how much torque each power source needs to meet the driver's demand and to achieve specified vehicle performance, fuel economy and exhaust gas emissions levels.

Figure 1A:
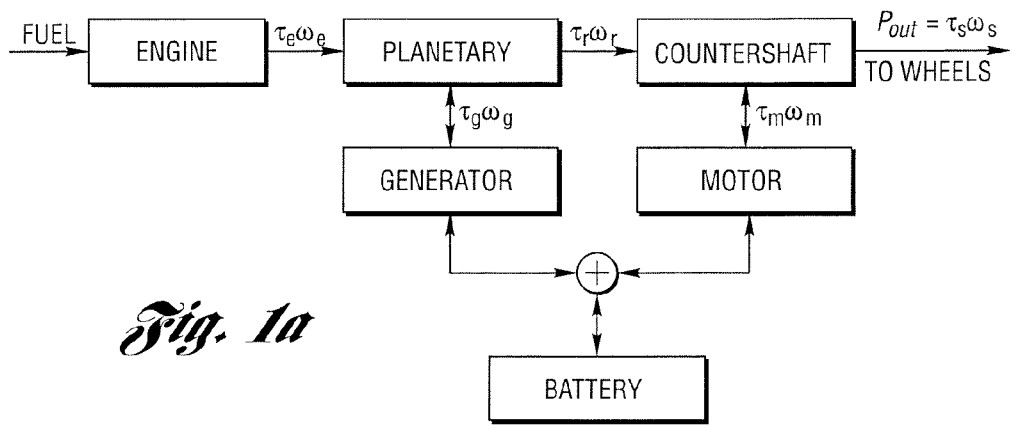
FIG. 1a is a block diagram of the elements of the powertrain of FIG. 1 illustrating the power flow paths between the elements.

FIG. 1a shows the possible power flow paths between the various elements of the powertrain in the configuration illustrated in FIG. 1. When the powertrain is acting in a split power mode using the so-called first power flow path described above, the engine output power is split into two paths by controlling the generator mechanical torque flow path $\tau_e \omega_e$ from the engine to the carrier of planetary gearing, and from the ring gear of the planetary gearing to the countershaft gearing ($\tau_r \omega_r$). In the electric torque flow path $\tau_g \omega_g$ and $\tau_m \omega_m$, torque is delivered from the engine to the generator to the motor and then to the countershaft gearing.

The embodiment of the invention shown in FIG. 2 includes counterparts for many of the elements described with reference to FIG. 1. It includes a generator 40 with a stator 42 and a rotor 44. A planetary gear system 46 has a ring gear 48, a sun gear 50 and a planetary carrier 52. The carrier is connected to the crankshaft of engine 54 through a suitable damper assembly 56 during generator drive operation. The carrier is braked by a first brake, overrunning coupling 58, against the transmission housing. The ring gear 48 can be braked by a second brake 60 to provide reaction torque when the engine drives the generator to charge the battery.

Figure 2:
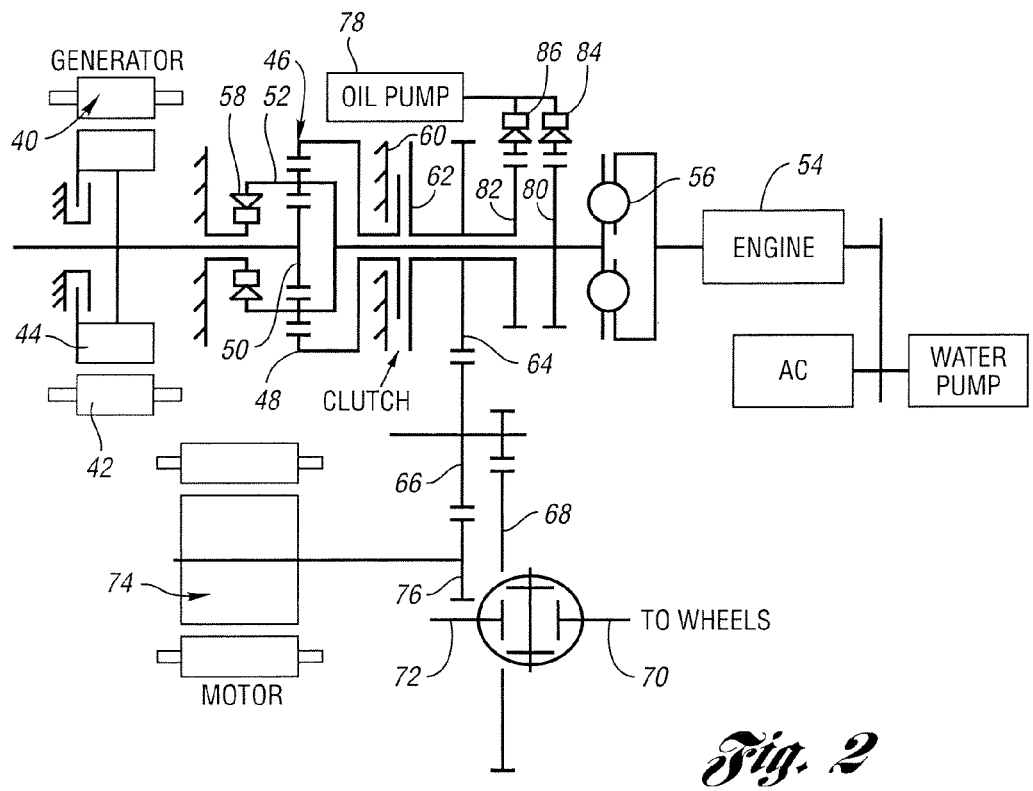
FIG. 2 is a schematic representation of a powertrain that employs the features of the present invention.

Rotor 44 and sun gear 50 can be braked by the brake for rotor 44 shown in FIG. 2, which corresponds to brake 28 shown in FIG. 1, to establish a mechanical torque flow path between the engine and gear 64.

During operation in the power-split, parallel operating mode, ring gear 48 is clutched by clutch 62 to output gear 64, which meshes with countershaft gear 66. A second countershaft gear engages differential gear 68, which distributes torque to each of the axle shafts 70 and 72. During operation in this mode, motor 74 supplies torque to gear 76, which meshes with countershaft gear 66 to provide parallel torque delivery to the wheels. The motor and the generator are electrically coupled to a battery, as in the system of FIG. 1.

An oil pump for the transmission is driven by oil pump drive gears 80 and 82 through overrunning couplings 84 and 86, respectively.

In the design of FIG. 1, the ring gear is directly coupled to the motor and to the wheels through the final drive gearing. Mechanical power thus is distributed to the countershaft gearing from both the planetary gears and the motor. This presents a problem if there is a need to run the engine to charge the battery while the vehicle is in the reverse drive mode. In that instance, with the motor/generator and battery sub-system acting as a power source, it is necessary in the design of FIG. 1 for the motor 12 to generate enough power to overcome the ring gear torque while moving the vehicle in reverse. This adversely affects reverse drive performance.

In contrast to the design of FIG. 1, the design of the present invention, seen in FIG. 2, provides improved reverse gear performance. The addition of the clutch 62 in the powertrain decouples the ring gear from the countershaft gearing. Further, the brake 60 anchors the ring gear 48. This provides a reaction point as the engine drives the generator to charge the battery when the motor is operating in the reverse drive mode and the battery state-of-charge is lower than a desired threshold value. If the battery is being charged, the engine driven generator can supply electric power to the motor, and any excess generated power can be stored in the battery.

If the generator is used as a starter motor to start the engine, the brake 60 is applied, thereby providing a reaction torque as carrier torque is distributed to the engine crankshaft. There is no need for the electric motor to supply a reaction torque to the ring gear during the engine starter mode as in the case of the design of FIG. 1.

In the design of FIG. 2, the gear ratio between the engine and the generator, when the ring gear is grounded, is expressed as:

$$R = \frac{1+\rho}{\rho}$$

Figure 3:
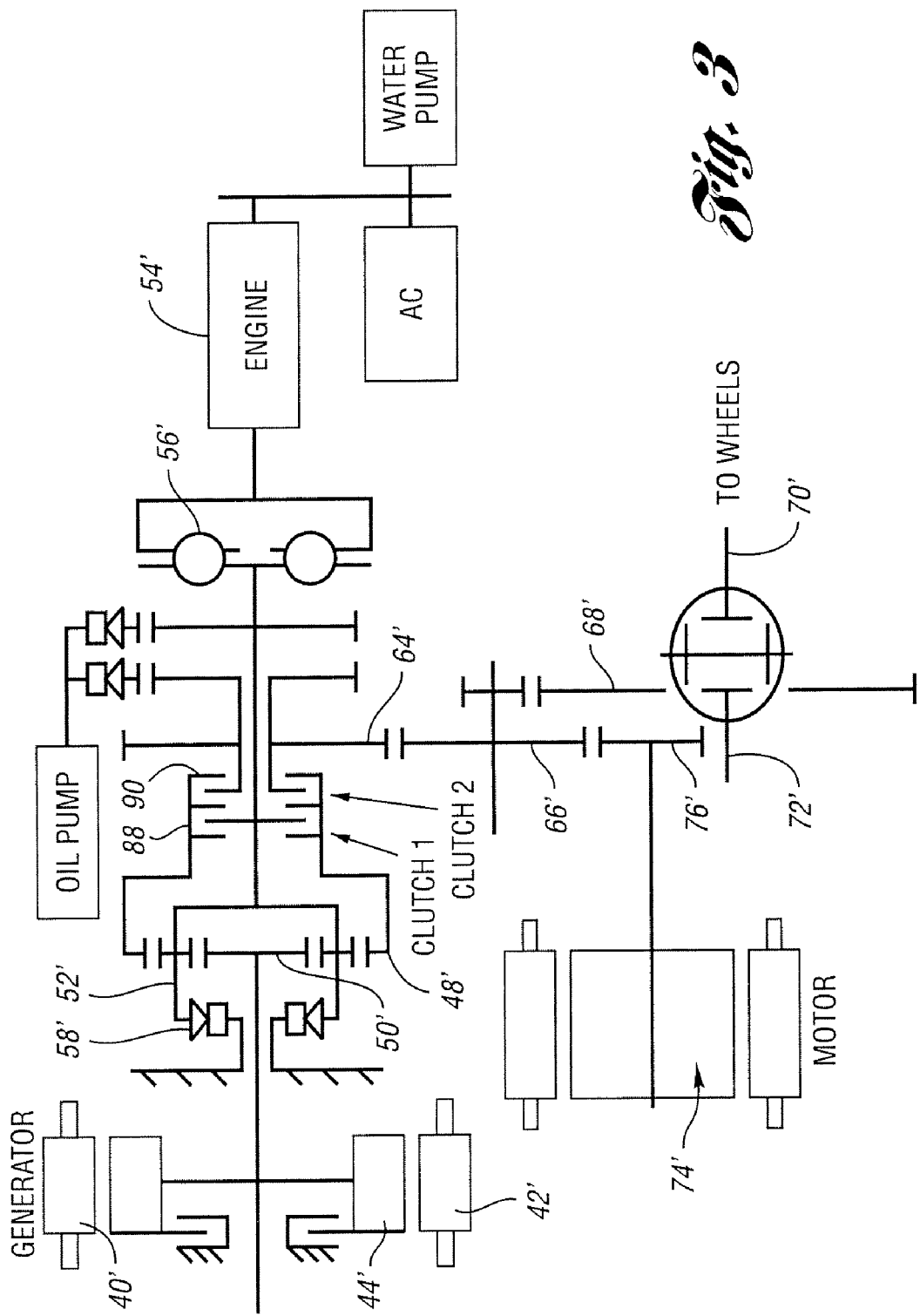
FIG. 3 is a schematic representation of an alternate embodiment of the powertrain of the present invention.

An alternate embodiment of the invention is shown in FIG. 3. In the case of FIG. 3, each of the components of the powertrain that have a counterpart in the design of FIG. 2 have been designated by similar reference numerals, although prime notations are added. In the case of FIG. 3, there are two clutches, rather than a clutch and a brake as shown in FIG. 2. The clutches are indicated in FIG. 3 at 88 and 90.

When clutch 90 is engaged and clutch 88 is disengaged, the system works in a manner similar to the operation of the design of FIG. 1. When the clutch 88 is engaged and the clutch 90 is disengaged, the ring gear and the sun gear are locked together so that the planetary gear ratio is unity. Further, the planetary gearing is isolated from the final drive gearing at this time. The clutch 88 directly links the engine output to the generator input with no reduction ratio between them.

During operation of the design of FIG. 1 in the engine starter mode with the generator acting as a starter motor, the motor supplies reaction torque to the ring gear. This, in effect, directly couples the engine to the wheels through the gearing. Any engine torque disturbances during starting operations will be transmitted to the wheels. This would be perceptible to the driver. This disadvantage is avoided by the designs of FIGS. 2 and 3 since the engine would be decoupled from the wheels.

Although an embodiment of the invention has been described and illustrated, it will be apparent to persons skilled in the art that modifications may be made without departing from the scope of the invention. All such modifications and equivalents thereof are intended to be covered by the following claims.

The invention claimed is:

1. A hybrid-electric wheeled vehicle powertrain comprising an internal combustion engine, an electric motor, an electric generator and a battery;

the electric motor, the electric generator and the battery being electrically connected to form an electrical power source;

a geared transmission defining power flow paths to vehicle traction wheels, the geared transmission having a first element connected drivably to the engine and a second element connected drivably to the motor;

a rotor for the generator being connected to a third element of the geared transmission; and a reaction brake for anchoring the second element of the geared transmission as the engine drives the electric generator during operation of the powertrain in a reverse driving power delivery mode, the electric motor being drivably connected through the geared transmission to the vehicle wheels;

the driving connection of the second element of the geared transmission to the motor comprising a clutch between the second element of the geared transmission and a torque output element of the powertrain whereby the motor, with the clutch disengaged, is isolated from the second element during reverse drive;

the reaction brake for anchoring the second element of the geared transmission being released and the clutch being engaged during operation of the powertrain in a split-power delivery mode in a forward vehicle driving direction.

2. The hybrid-electric wheeled vehicle powertrain set forth in claim 1 wherein the geared transmission has a planetary gear set including a sun gear connected to the generator, a ring gear, and a carrier connected to the engine;

the clutch, when engaged, completing a geared torque flow path between the engine and the vehicle traction wheels during forward drive operation, the reaction brake anchoring the ring gear when the generator is driven by the engine.

3. The hybrid-electric wheeled vehicle powertrain set forth in claim 1 wherein the reaction brake acts on the second element of the geared transmission to effect engine starting torque delivery from the generator to the engine as the generator functions as an engine starter torque source.

4. The hybrid-electric wheeled vehicle powertrain set forth in claim 1 wherein the geared transmission includes countershaft gears in a power flow path between the motor and the torque output element of the powertrain and between the second element of the geared transmission and the motor.

5. The hybrid-electric wheeled vehicle powertrain set forth in claim 2 wherein the reaction brake anchors the ring gear of the geared transmission to effect engine starter torque delivery from the generator to the engine as the generator functions as an engine starter torque source.

6. A hybrid-electric wheeled vehicle powertrain comprising an internal combustion engine, an electric motor, an electric generator and a battery;

the electric motor, the electric generator and the battery being electrically connected to form an electrical power source;

a geared transmission defining power flow paths to vehicle traction wheels, the geared transmission having a first element connected drivably to the engine and a second element connected drivably to the vehicle traction wheels;

a rotor for the generator being connected to a third element of the geared transmission; and a first clutch selectively connecting two elements of the geared transmission thereby establishing a direct drive between the engine and the electric generator as the engine drives the electric generator during operation of the powertrain in a reverse vehicle driving direction, the electric motor being drivably coupled through the geared transmission to the vehicle wheels;

the driving connection of the second element of the geared transmission to the vehicle traction wheels comprising a second clutch between the electric motor and the gear elements of the geared transmission, the second clutch being disengaged and the first clutch being engaged during reverse drive operation whereby the engine drives the generator to charge the battery through a torque flow path that is isolated from a reverse drive motor torque flow path.

7. The hybrid-electric wheeled vehicle powertrain set forth in claim 6 wherein the first clutch connects the first and second gear elements of the geared transmission to achieve a direct drive in a torque delivery path between the engine and the generator as the engine drives the generator to charge the battery.

8. The hybrid-electric wheeled vehicle powertrain set forth in claim 6 wherein the geared transmission has a planetary gear set including a ring gear, a sun gear connected to the generator and a carrier connected to the engine;

the second clutch completing a torque flow path between the ring gear and the vehicle traction wheels during forward drive operation.

9. The hybrid-electric wheeled vehicle powertrain set forth in claim 6 wherein the geared transmission includes countershaft gears in a power flow path between the motor and the traction wheels and between the second element of the geared transmission and the motor.

10. The hybrid-electric wheeled vehicle powertrain set forth in claim 8 wherein the first clutch connects the carrier and the ring gear of the geared transmission to achieve a direct drive in a torque delivery path between the engine and the generator as the engine drives the generator to charge the battery.

11. A hybrid-electric wheeled vehicle powertrain comprising an internal combustion engine, an electric motor, an electric generator and a battery;

the electric motor, the electric generator and the battery being electrically connected to form an electrical power source;

a geared transmission defining power flow paths to vehicle traction wheels, the geared transmission having a first gear element connected to the engine and a second gear element connected drivably to the motor;

a rotor for the generator being connected to a third element of the geared transmission;

means for establishing a driving connection between the engine and the generator through the gear elements during operation of the powertrain in a reverse driving power delivery mode, the electric motor being drivably connected to the vehicle traction wheels; and means for isolating a torque flow path between the motor and the vehicle traction wheels from a torque flow path between the engine and the generator.

* * * * *